United States Patent [19]

Armstrong

[11] 4,066,823
[45] Jan. 3, 1978

[54] METHOD FOR A LOW TEMPERATURE OXYGEN ELECTRODE

[76] Inventor: William A. Armstrong, 1265 Greyrock Crescent, Ottawa, Ontario, Canada, K2C 2A6

[21] Appl. No.: 723,485

[22] Filed: Sept. 15, 1976

Related U.S. Application Data

[63] Continuation of Ser. No. 505,145, Sept. 11, 1974, abandoned.

[30] Foreign Application Priority Data

Sept. 11, 1973 Canada ................................. 180804

[51] Int. Cl.$^2$ ............................................. H01M 4/86
[52] U.S. Cl. ...................................... 429/41; 141/1.1; 252/425.3
[58] Field of Search ..................... 429/40–45; 141/1.1; 252/425.3

[56] References Cited

U.S. PATENT DOCUMENTS

| 3,432,355 | 3/1969 | Niedrach et al. | 429/42 |
| 3,668,014 | 6/1972 | Katsoulis | 429/42 |
| 3,899,354 | 8/1975 | Kordesch | 429/67 |

*Primary Examiner*—Charles F. LeFevour

*Attorney, Agent, or Firm*—Millen & White

[57] ABSTRACT

An improved gas permeable hydrophobic electrode and its method of manufacture is provided. The electrode includes (a) a current collecting grid formed of an electrically conductive metal, e.g. platinum, gold, stainless steel, nickel-clad iron, nickel wire mesh, silver wire mesh, expanded nickel, or expanded silver; (b) a noble metal catalyst, e.g. silver, platinum or palladium catalyst deposited on, and adhered to, both side faces of the current collecting grid, e.g. the nickel grid, such noble metal catalyst, e.g. silver, having been deposited in situ on a fugitive substrate, e.g. aluminum foil, from a paste of an aqueous suspension of a water-soluble metal salt, e.g. silver salt, a fluorocarbon polymer, e.g. polytetrafluoroethylene, a wetting agent, e.g. octyl phenoxpolyethoxyethanol and activated carbon, which is subsequently dried and cured at a temperature not exceeding about 150° C.; and (c) a hydrophobic semi-permeable membrane, e.g. a fibrous polytetrafluoroethylene membrane or a microporous polypropylene membrane on one side of such coated grid. The improved method of manufacture involves applying the above-noted paste to a fugitive substrate and then drying and curing such paste at a temperature not exceeding about 150° C.

7 Claims, 4 Drawing Figures

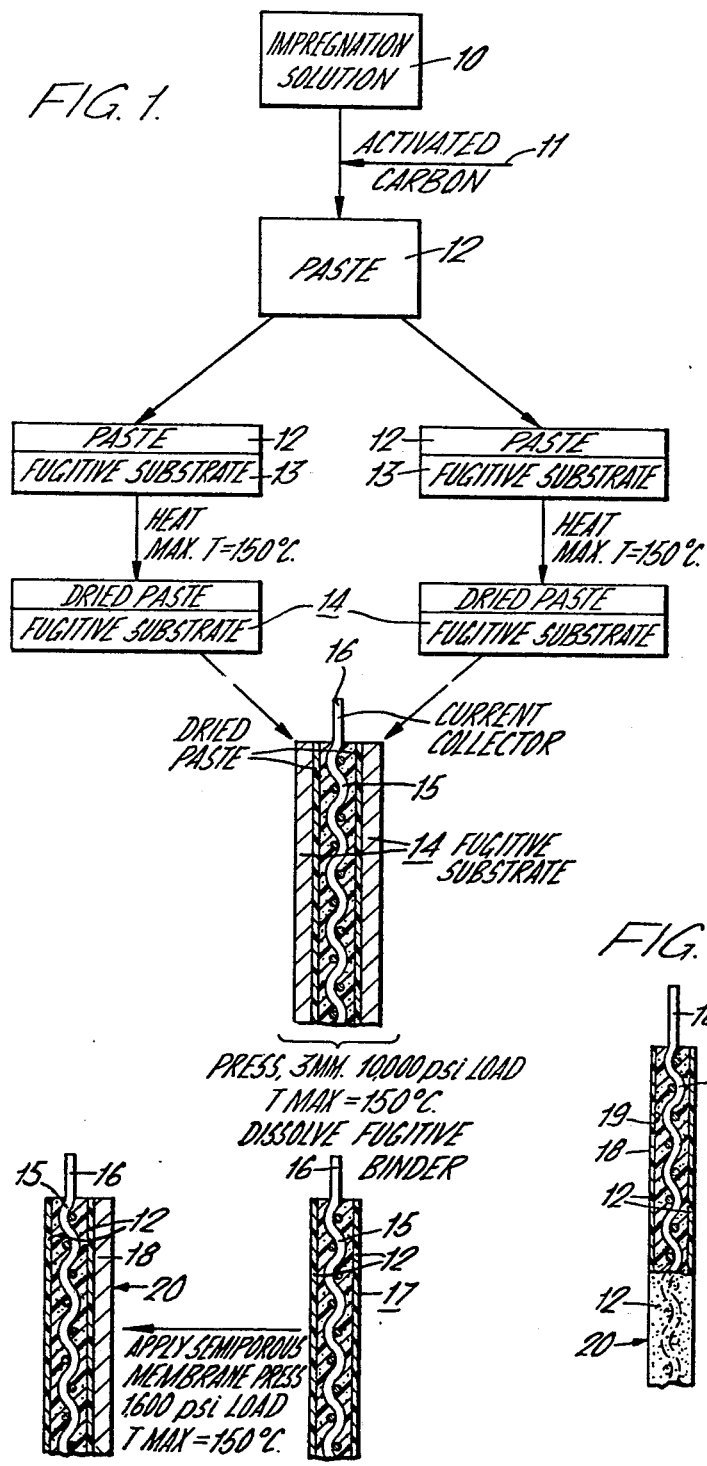

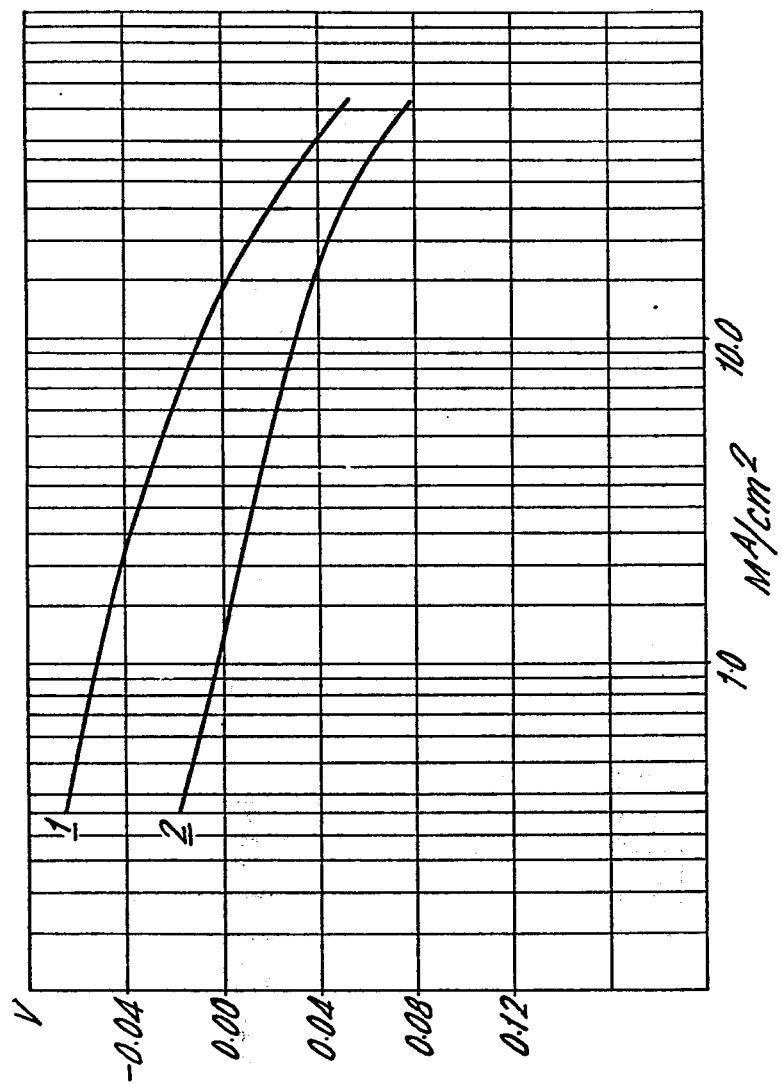

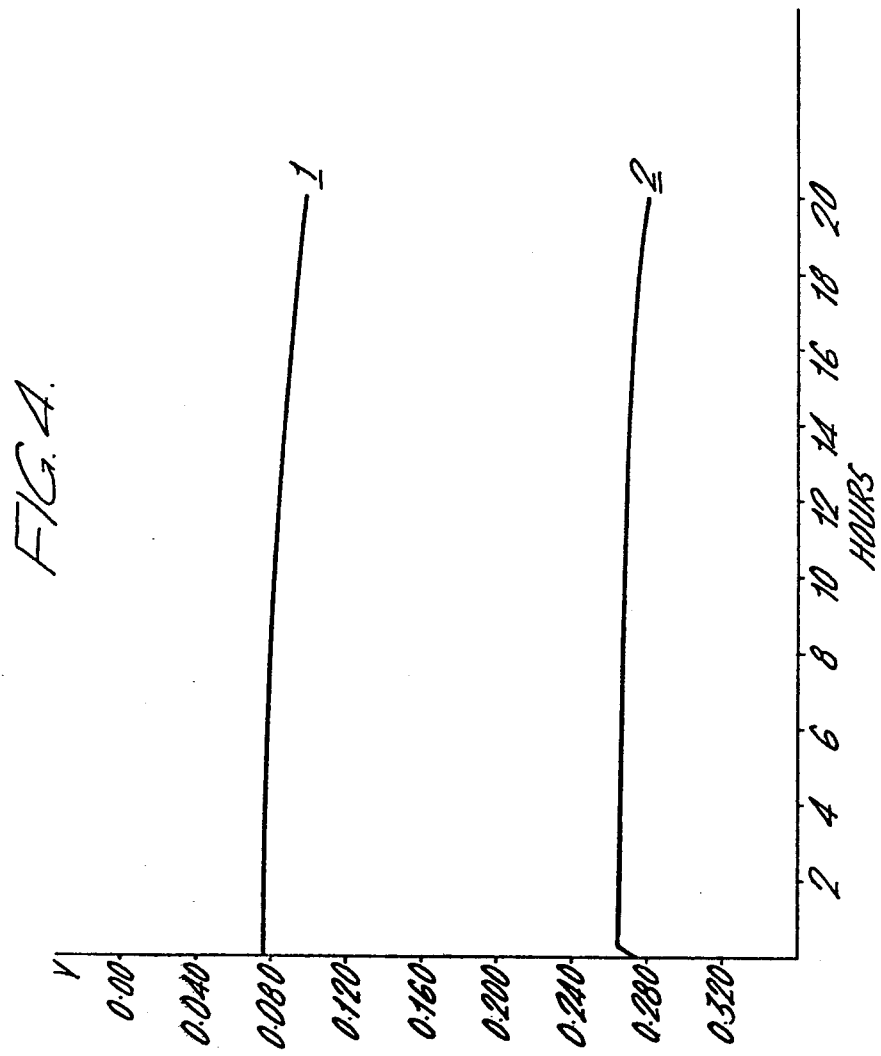

METHOD FOR A LOW TEMPERATURE OXYGEN ELECTRODE

This is a continuation of application Ser. No. 505,175, filed sept. 11, 1974, now abandoned.

BACKGROUND OF THE INVENTION

General

This invention relates to an oxygen electrode (i.e. cathode) having good performance characteristics even down to temperatures of about $-40°$ C., which makes it suitable for coupling with either a fuel electrode (to form a fuel cell) or a metal anode (to form a metal-air battery).

Prior Art

Many metals and metal oxides may be used as catalysts in oxygen electrodes. However, to be effective, they must possess certain properties such as, for example, high surface area and high electrical conductivity. As most of the best catalysts, e.g. platinum, palladium and silver, are very expensive, numerous methods have been devised for depositing the catalyst on a suitable conducting substrate such as, for example, carbon or nickel. The method used to impregnate the substrate is critical because it affects the distribution and the surface properties of the catalyst as well as the bonding of the catalyst to the substrate.

One of the limitations of existing oxygen electrodes is primarily of an economic nature. High costs are due not only to the use of precious metals but also to complicated production procedures.

Another of the limitations of existing oxygen electrodes is that they exhibit high polarizations when operating at very low temperatures, e.g. of about $-40°$ C. This drastically limits the usefulness for applications in northern regions of devices in which they are a critical component, e.g. the zinc/air battery and the hydrazine/air fuel cell.

U.S. Pat. No. 3,328,204 issued June 27, 1967 to W.T. Grubb described a fuel cell capable of oxidizing fluid, saturated hydrocarbon fuels to carbon dioxide with the production of electrical energy at current densities up to and including the maximum power capability of the fuel cell under the cell operating conditions. The fuel cell was a pair of gas absorbing, gas-permeable, electronically conductive electrode elements in direct contact with an aqueous phosphoric acid solution. The fuel cell was operated so that the electrolyte was at a temperature of at least about 130° C. but no greater than about 250° C. and also was in the range of from about 100° C. below the boiling point up to the boiling point of the particular concentration of electrolyte used at the ambient pressure above the electrolyte. Accordingly, no utility for the fuel cell was forecast for temperatures as low as about $-40°$ C.

The patentee in the aforesaid U.S. Pat. No. 3,328,204 taught that, although a number of different types of electrode structures were suitable for use in such cells, the cathode electrode should be one which: would be electronically conductive; would adsorb the fuel or oxidant employed; would act as a catalyst of the electrode reaction; and would not itself be oxidized or corroded severely under the operating conditions of the cell. Especially suitable materials disclosed included the noble metals, i.e. gold and the noble metals of the Group VIII series of metals of the Periodic Table of Elements namely, rhodium, ruthenium, palladium, osmium, iridium and platinum. Because of their ready availability and suitability, platinum and palladium were preferred. The patentee also taught that other metals, including metals of the Group VIII series of metals, e.g. nickel, iron, cobalt, etc. as well as other metals known catalytically to adsorb gasses, e.g. silver, copper, metals of the transition series, e.g. manganese, vanadium, rhenium, etc., would be operative. However, such metals under normal cell operating conditions would be severely attacked by the phosphoric acid. In order to be used for long term operation, they would have to be protected, for example, be electrolytically plated or be alloyed with a non-corrodable metal, e.g. platinum, palladium, etc., prior to use. In addition, it was taught that the electrodes could be formed of carbon which had been activated with the noble metals of the Group VIII series, e.g. with platinum or with palladium. The patentee further taught that, for maximum cell performance, the electrodes should be made by using the very active noble metal powders of the Group VIII metals, for example, platinum black, palladium black, etc.

Many were disclosed by the patentee of the aforesaid U.S. Pat. No. 3,328,204 for constructing the catalytically active electrodes. For example, they could be of the skeletal type obtained by forming an alloy of two metals and dissolving one of the metals leaving the other metal in a porous sheet of sufficient rigidity to use as the electrode. The metal powders could be compacted and sintered to produce the suitable electrodes having a porous nature, and if desired, could be of a multi-porous nature whereby the pores in contact with the electrolyte would be smaller than the pores in contact with the fuel or oxidant gas. They could also be made by mixing metal powders with an inert binder, for example, polytetrafluoroethylene. A disclosed very desirable electrode structure could be made by incorporating metal powders in polytetrafluoroethylene which had an additional film of polytetrafluoroethylene without metal particles on the electrode side in contact with the fluid fuel or oxidant gas.

Thus the patentee of U.S. Pat. No. 3,328,204 provided electrodes either made using expensive catalyst materials or catalyst materials which are admitted to be severely attacked during the use of the fuel cell. He also provided a fuel cell which could not be functional at about $-40°$ C.

U.S. Pat. No. 3,401,062 issued Sept. 10, 1968 to E. H. Lyons, Jr. provided a photoregenerative cell incorporating a photoreducible anode, and an oxygen cathode. The patentee taught that the oxygen cathode should be in intimate contact with the electrolyte. The function of the cathode was to adsorb oxygen, ionize it and transfer it to the electrolyte. Any material suitable for carrying out these functions could suffice. Lithium-doped transition metal oxides, porous or sintered platinum, silver powder, nickel oxide doped with lithium, palladium and carbon impregnated with catalysts were disclosed as being just a few of the suitable materials for the cathode. The cathode could assume various physical forms; however, it should ordinarily be porous so that the necessary adsorption and ionization could take place.

The cathode could be prepared by sinter-casting techniques. This applied equally well to silver, nickel and lithiated nickel cathodes. The doped nickel could be prepared by either of two methods. In one method, an intimate mixture of $Li_2O_2$ and $NiO$ could be pressed into a pellet, sealed in a vessel and heated to 900° C. In another method, nickel could be reacted with a thermally decomposable salt of lithium, such as, for example, LiOH or LiNO$_3$ by: (a) impregnating a sintered nickel electrode with a solution of the salt and firing to about 800° C., or (b) impregnating nickel particles, firing, pressing and sintering the lithiated particles into a porous electrode body. Reinforcement of the lithiated nickel was taught as being possibly advisable.

In this patent, too, the disclosure of the suitable oxygen electrode involved the use of expensive or not readily available materials. Furthermore, there was no disclosure of utility at temperatures of about −40° C.

U.S. Pat. No. 3,432,355 was issued Mar. 11, 1969 to L. N. Niedrach and H. R. Alford provided gas permeable, hydrophobic fuel cell electrodes. The electrodes comprised gas adsorbing metal particles bonded together into a cohesive mass with polytetrafluoroethylene and had a coating of polytetrafluoroethylene bonded to the electrode surface in contact with the gas phase.

The patentee taught in the aforesaid U.S. Pat. No. 3,432,355 that each electrode should be one which: would be electronically conductive; would adsorb the fuel or oxidant employed; would act as a catalyst for the electrode reaction; and would not itself oxidize severely under the operating conditions of the cell. Suitable such gas adsorbing metals are well known.

Suitable materials disclosed by the patentees of the U.S. Pat. No. 3,432,355 included the noble metals of Group VIII series of metals of the Periodic Table of Elements, namely, rhodium, ruthenium, palladium, osmium, iridium, and platinum. Other suitable metals included the other metals of Group VIII, e.g. nickel, iron, cobalt, etc., as well as other metals known catalytically to adsorb gasses, e.g. silver, copper, and metals of the transition series, e.g. manganese, vanadium, rhenium, etc. In addition to electrodes formed of these metals the electrodes could be formed of platinum or palladium black which had been deposited on a base metal such as, for example, stainless steel, iron, nickel and the like. In addition, suitable electrodes could be formed from metal oxides and carbon which had been activated with platinum or palladium, or from carbon which had been activated with oxides of iron, magnesium, cobalt, copper, etc.

For maximum cell performance, the patentees of the aforesaid U.S. Pat. No. 3,432,355 preferred to make the electrodes by using the very active metal powders of the Group VIII metals, for example, platinum black, palladium black, Raney nickel, etc. The noble metals of the Group VIII series of metals had the further advantage in that when the electrolyte was an acid, corrosion conditions existed both at the anode and at the cathode which shortened the life of the cells having electrodes incorporating metals such as, for example, nickel, iron, copper, etc. This effect was stated not to occur in cells having electrodes made from the noble metals of the Group VIII metals. The corrosive effect would not be as pronounced in fuel cells using bases as the electrolyte. Long cell life could be obtained by using any metals which are resistant to bases, for example, the Group VIII metals, including nickel, cobalt, etc., as well as other known gas adsorbing metals, e.g. rhenium, in cells having an aqueous base electrolyte.

Many ways were disclosed by the patentees in the aforesaid U.S. Pat. No. 3,432,355 for constructing the catalytically active electrodes. One means which could be used easily to construct these electrodes was to take an aqueous emulsion of polytetrafluoroethylene resin and form a thin film on a casting surface such as a sheet of metal foil, metal plate, etc., forming the final shape of the electrode, if desired, evaporating the water and wetting agent from the emulsion, followed by sintering of the polytetrafluoroethylene, under pressure if desired, at a temperature high enough to cause the sintering of the individual particles of polytetrafluoroethylene into a coherent mass, e.g. from about 325° C. to about 450° C., preferably from about 350° C. to about 400° C. The time of heating would be sufficient to insure that all particles of resin reach the desired temperature, usually about 1 to 2 minutes. Thereafter, an aqueous emulsion of polytetrafluoroethylene resin would be mixed with sufficient metal particles that the final layer prepared from this mixture would be electronically conductive, for example, from about 2 to about 20 grams of the metal powder per gram of polytetrafluoroethylene resin in the emulsion. This mixture would be spread in a thin layer on the previously formed film of polytetrafluoroethylene resin followed by evaporation of the water and wetting agents from the emulsion and sintering of the polytetrafluoroethylene in the mix, preferably under pressure, for example, about 1000 to about 3000 p.s.i. at a temperature of about 350° C. to about 400° C. for about 2 to about 10 minutes. Thereafter, the electrode would be removed from the casting surface and would be cut to the desired shape if not so formed by the casting operation.

The patentees of the aforesaid U.S. Pat. No. 3,432,355 further disclosed that if a current collecting grid was to be incorporated into the electrode structure, such a current collecting grid, for example, metal wires, metal strip, metal wire mesh, sintered porous sheet, punched or expanded metal plates, porous metal sheet, etc., could be incorporated into the aqueous polytetrafluoroethylene metal mix before evaporation of the water. Alternatively, a sandwich-type of electrode could be made wherein a casting surface is first coated with polytetrafluoroethylene, followed by a coating of the polytetrafluoroethylene metal mix which is dried but need not be sintered. The polytetrafluoroethylene-metal mix also could be used to cast a thin layer on a separate casting surface without first forming the polytetrafluoroethylene film. This would be dried but need not be sintered and a sandwich would then be made with the current collecting grid between the two layers still on the casting surfaces. This sandwich would be pressed and sintered, followed by removal of the casting surfaces to give an electrode in which the current collecting grid formed an integral part of the electrode.

The patentees of the aforesaid U.S. Pat. No. 3,432,355 further taught that filters, such as, for example, fibrous cloth or mat, preferably of fibers that are resistant to highly acidic or basic conditions which they will encounter in the fuel cell, for example, glass, asbestos, acrylonitrile, vinylidene chloride, polytetrafluoroethylene, etc., could be impregnated and surface coated with a mixture of polytetrafluoroethylene and metal powder. Such a technique was taught to be desirable if the current collecting grid was not incorporated as an integral part of the electrode, but merely pressed to the surface of the electrode on the electrolyte side where it could make contact with the metal particles. Such a technique tended to decrease the effective surface area of the electrode in contact with the electrolyte and therefore it was preferred to incorporate the current collecting grid into the electrode structure.

The patentees of the aforesaid U.S. Pat. No. 3,432,355 also taught that although other materials such as, for example, polytrifluorochloroethylene, polyethylene, polypropylene, polytrifluoroethylene, etc., could conceivably be substituted for the polytetrafluoroethylene, the chemical resistance of these materials was inferior to polytetrafluoroethylene under the conditions encountered in the fuel cells and therefore such substitution could only be made with considerable sacrifice in the desired performance and stability of the electrodes.

Suitable electrolytes for use in the cells have been disclosed in the patents referred to above. These included a solid, a liquid, a liquid adsorbed upon a perforate solid matrix, a jelled-liquid or any other suitable physical form. The chemical constituency of the electrolyte could include, for instance: a mixture of alkali carbonates contained in the capillary pores of a ceramic matrix; solid solutions and solid-state reaction products of selected, mixed conductive oxides, for example, $ZrO_2$—$MgO$, $ZrO_2$—$CaO$, $HfO_2$—$CaO$, $ZrO_2$—$Y_2O_3$, $ZrO_2$—$La_2O_3$ and similar systems; an aqueous caustic electrolyte solution which has been jelled by adding to it one or more of the following: carboxymethyl cellulose in very weak alkaline solution, guar gum, synthetic resin of various types, calcium stearate or other soaps, or a hydrous oxide, for example, $Fe(OH)_3$, $Sc(OH)_3$, $Y(OH)_3$, $La(OH)_3$ or other lanthanides; or an ion exchange membrane, a water solution of about 5% to about 60% NaOH or KOH absorbed on a matrix composed of a major amount of MgO and minor amounts of one or more additives, such as, for example, $Al_2O_3$, $SiO_2$, other refractories, CaO and BaO.

The aqueous electrolytes are usually aqueous solutions of strong acids or strong bases, but salt systems having buffering action could be used. Strong acids and strong bases are those having a high degree of ionization. Salt systems having buffering action are well known, for example, sodium dihydrogen phosphate-potassium monohydrogen phosphate, potassium carbonate-potassium bicarbonate, phosphoric acid-sodium dihydrogen phosphate, etc. The concentration of the electrolyte should be as high as can be tolerated by the materials of construction of the cell. Likewise, the electrolyte should be soluble in the aqueous phase and should have a low enough vapor pressure that it does not volatilize into the gaseous phase. Because of these limitations, the most desirable electrolytes are sulfuric acid, phosphoric acid, the aromatic sulfonic acids such as, for example, benzene, mono-, di- and trisulfonic acids, toluene mono-, di- and trisulfonic acids, the naphthalene sulfonic acids such as, for example, the $\alpha$- and $\beta$-naphthalene monosulfonic acids and the various naphthalene disulfonic acids, etc. In general, acids and bases having a dissociation constant of at least about $1 \times 10^{-4}$ are satisfactory. Typical of the bases which may be used are sodium hydroxide, potassium hydroxide, lithium hydroxide, cesium hydroxide, rubidium hydroxide, etc. In view of their ready availability, stability under fuel cell operating conditions, low cost and high degree of ionization in aqueous solution, it was preferred to use inorganic acids, e.g. sulfuric acid, phosphoric acid, etc., or inorganic bases, for example, sodium hydroxide, potassium hydroxide, etc. For effective operation, a three phase boundary should be set up between the catalyst, oxygen and the electrolyte.

As noted hereinbefore, the conventional oxygen electrodes, including those referred to in the patents discussed hereinabove, exhibit high polarizations when operating at low temperatures and this drastically limits the usefulness for applications in cold climates of devices in which they are a critical component, for example, the zinc/air battery and the hydrazine/air fuel cell. At about $-40°$ C., the limiting current densities for the best available oxygen electrodes are about $20 mA/cm^2$ while zinc/air batteries are designed to operate with air cathode current densities of about $50 mA/cm^2$. In addition, oxygen electrodes containing low concentrations of wet-proofing materials tend to "weep" electrolyte.

It is known that both the activity of the catalyst and the structure of the electrode affect the low temperature performance of the electrode. There has been a tendency heretofore to concentrate on increasing the activity of the catalyst and to aim for good room temperature performance at high current densities (about $100 mA/cm^2$). However, zinc/air batteries are normally used at such high current densities because of associated problems with cell dry out.

BRIEF DESCRIPTION OF THE INVENTION

Aims of the Invention

The aim of the present invention and consequently the object of a principal aspect of this invention is to develope an oxygen electrode which will perform satisfactorily at current densities up to about $50 mA/cm^2$ over the temperature range about $-40°$ C. to about $30°$ C.

Broad Aspect of the Invention

By a broad aspect of this invention, an improved gas permeable hydrophobic electrode structure is provided comprising: (a) a current collecting grid formed of a grid of an electrically conductive metal, e.g. a nickel wire mesh, silver wire mesh, expanded nickel, or expanded silver; (b) a noble metal catalyst, e.g. platinum, or palladium or silver catalyst deposited on, and adhered to, both side faces of the electrically conductive metal grid, such noble metal catalyst having been deposited in situ on a fugitive substrate from a paste of an aqueous suspension of a water-soluble silver salt, water, a fluorocarbon polymer, e.g. polytetrafluoroethylene, a wetting agent and activated carbon, which is subsequently dried and cured at a temperature not exceeding about 150° C., and (c) a hydrophobic semi-permeable membrane, e.g. a fibrous polytetrafluoroethylene membrane or a microporous polypropylene membrane on one side of such coated electrically conductive metal grid.

Other Features of the Invention

By another aspect of this invention, an improvement is provided in a process for preparing a gas permeable hydrophobic electrode structure in which a catalyst is bound to both faces of a metal grid current collector grid and in which a semi-permeable membrane, e.g. a fibrous polytetrafluoroethylene or a microporous polypropylene membrane, is provided on one side of the coated grid, the improvement comprising the steps of: forming a paste comprising an aqueous solution of water-soluble noble metal salt, a fluorocarbon polymer, e.g. polytetrafluoroethylene-wetting agent suspension and activated carbon; applying such paste to a fugitive substrate; drying and curing such paste at a temperature not exceeding about 150° C.; placing such metal current collector in contact with such dried paste; pressing the sub-assembly at a temperature not exceeding about 150°

C.; removing such fugitive substrate; applying such semi-permeable membrane to such sub-assembly; and pressing such assembly together at a temperature not exceeding about 100° C.

Preferred Aspects of the Invention

The preferred catalyst is silver. However, other noble metal catalysts, e.g. platinum or palladium, may be used.

The preferred current collectors are silver and nickel, in wire mesh or expanded metal form. However, other metals, e.g. platinum, gold, stainless steel, nickel-clad iron, etc., may be used.

It is essential that the electrode be faced with a semi-permeable membrane formed of a hydrophobic material, e.g. a fluorocarbon polymer, preferably fibrous polytetrafluoroethylene or a microporous polypropylene. The semipermeable membrane may be a fibrous polytetrafluoroethylene known by the Trade Mark of Raybestos-Manhattan R/M No. 827 Porous TFE-Type P-30 or that known by the Trade Mark of Zitex E610-222 or the microporous polypropylene known by the Trade Mark of Celgard 2400.

DESCRIPTION OF THE DRAWINGS

Brief Description of the Drawings

In the accompanying drawings,

FIG. 1 is a schematic diagram indicating the steps in the preparation of an electrode according to one aspect of this invention;

FIG. 2 is an idealized vertical cross-section of an oxygen electrode structure of the embodiment of this invention, prepared according to the steps of FIG. 1;

FIG. 3 is a graph of voltage ordinate against mA/cm$^2$ at temperatures of about 24° C. and about −40° C.; and FIG. 4 is a graph of voltage as ordinate versus time, in hours, of two electrodes operated at about 50 mA.cm$^2$ and about −40° C.

Description of FIG. 1

As seen in FIG. 1, an impregnating solution 10 is made up, the composition of which determines the nature of the electrode. It generally contains a solution of the noble metal, e.g. an aqueous solution of silver nitrate, and a suspension of the fluorocarbon polymer, e.g. polytetrafluoroethylene, and a wetting agent, e.g. octyl phenoxypolyethoxyethanol. To this solution is added, via line 11, activated carbon to provide a paste 12. The paste 12 is applied to one surface of a fugitive substrate 13, e.g. aluminum foil. For each electrode, two such sub-assemblies are provided.

The pasted sub-assembly (paste 12 - fugitive substrate 13) is then dried, heated to a maximum temperature of about 150° C. and cured at such temperature for about ½ hour, to provide a dried sub-assembly 14. A current collector grid 15, e.g. nickel mesh, including a tab 16 extending from one corner thereof is sandwiched between two such sub-assemblies 14, with the fugitive substrate layers on the outside. Then the assembly is pressed for about 3 minutes at a maximum temperature of about 150° C. with a load of about 6400 p.s.i. The fugitive substrate is then removed; if the substrate is aluminum foil, it is dissolved with about 20% KOH solution. This leaves assembly 17.

A semi-porous membrane sheet 18 of polytetrafluoroethylene or polypropylene is then applied to one of the dried paste faces and the assembly is pressed for about 3 minutes at about 1600 p.s.i. at a maximum temperature about 100° C. This provides the electrode 20, shown in greater detail in FIG. 2.

Description of FIG. 2

In FIG. 2 of the accompanying drawing, the oxygen electrode 20 includes a nickel grid 15 which provides a catalyst support as well as acting as a current collector. A current collector tab 16 is provided at one corner of grid 15. On both side faces of the grid 15 is the catalyst carrier combination 12 bound to the grid, in the manner described with reference to FIG. 1. A semi-permeable hydrophobic membrane 18, e.g. of a fibrous polytetrafluoroethylene or a microporous polypropylene is secured to one side face 19 of one of the catalyst-carrier combinations 12.

DESCRIPTION OF AN EMBODIMENT

The following example is given to illustrate the preparation of an oxygen electrode of one aspect of this invention.

Example

An electrode having the composition about 5.0mg/cm$^2$ silver, about 20mg/cm$^2$ activated carbon, and about 2.5mg/cm$^2$ Teflon is prepared in the following manner:

An impregnation solution is prepared by dissolving 1.386 g. silver nitrate in 11.98 ml. of distilled water and adding about 0.5 ml. of Teflon - 30, a suspension containing 0.8697g/ml. of Teflon. The solution is mixed thoroughly. As colloidal silver is formed in the impregnation solution over a period of time, the solution should be used within 1 hour after preparation. The electrode is most easily made in two halves. For each half, 0.36 ml of impregnation solution is thoroughly mixed with 0.100g. of Darco G-60 activated carbon on a 1.25 in$^2$ piece of aluminum foil. The resulting pastes are spread evenly and the two foils are dried, heated to about 150° C. and cured at this temperature for about 0.5 h. A current collector consisting of a 1.25 in$^2$ piece of Exmet 5 Ni 5 - 5/0 with a 0.50 in$^2$ tab extending from one corner is sandwiched between the pasted foils (bare aluminum on the outside) and the whole pressed for about 3 min. at about 150° C. and with about 10,000 lb. load (about 6400psi). The aluminum foil is subsequently dissolved in 20% KOH solution. After washing and drying, a 1.25 in$^2$ piece of Raybestos-Manhattan Inc. R/M No. 827 Porous TFE P-30 is applied to one side of the electrode at a temperature of about 100° C. and a pressure of about 2500 lb. (about 1600psi) maintained for about 3 minutes.

Good results have been obtained with electrodes having a silver loading of 2.5 - 7.5 mg/cm$^2$, and activated loading of 20 mg/cm$^2$ and a Teflon loading of 2.0 - 4.0 mg/cm$^2$. Nickel wire mesh, expanded silver or silver wire mesh can also be used as current collectors. Zitex 610-222 and Celgard 2400 have been used successfully in place of the Raybestos-Manhattan porous membrane.

Description of FIGS. 3 and 4

The effect of temperature on the potential of the electrode prepared according to the above example relative to a mercury/mercuric oxide reference electrode during operation in air with 30% KOH electrolyte is shown in FIG. 3. Curve 1 was obtained at about 24° C. and curve 2 at about −40° C.

FIG. 4 shows the surprising and unobvious effect of curing and pressing at a temperature not exceeding about 150° C. Such beneficial effect on the low temperature performance is illustrated in FIG. 4 where the potential of the air cathode during operation at about 50mA/cm$^2$ and about −40° C. in air with 30% KOH electrolyte is plotted against the number of hours of operation. Curve 1 was obtained using an oxygen electrode prepared as described in the example above, while curve 2 was obtained using an electrode prepared in a similar manner, the only difference being that the curing and pressing temperature was about 305° C. instead of about 150° C. The polarization of this second electrode is about 180mV greater.

The curing and pressing at the relatively low temperature of about 150° C. is, in itself, unobvious. In order adequately to wet-proof an oxygen electrode, it has previously been thought necessary to raise the temperature to about 300° C. during pressing in order to have the Teflon flow around the catalyst particles. While it is not desired to be restricted to any particular theory, it is believed that the poor performance of prior electrodes may be due to the fact that at such high temperatures the surface of the catalyst may be oxidized.

It is also essential that the fluorocarbon suspension include a wetting agent. Teflon - 30 contains a wetting agent which helps to keep the Teflon particles in suspension. The use of the wetting agent in the Teflon - 30 for the reduction of silver nitrate appers to permit the simultaneous impregnation and wet-proofing of the activating carbon in a low temperature, short duration process.

CONCLUSIONS

Accordingly, by the present invention, the low temperature performance of conventional oxygen electrodes has been optimized by optimizing both the activity of the catalyst and the electrode structure by the use of high loadings of noble metal catalysts and low concentrations of wet-proofing materials.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:

1. An improved method for preparing a gas permeable hydrophobic electrode structure comprising: the first step of applying a paste comprising water, a wetting agent and solids consisting essentially of a water-soluble noble metal salt, a fluorocarbon polymer, and activated carbon to a fugitive substrate; the second step of heating and drying such paste at a temperature not exceeding about 150° C for a time sufficient to provide a first unit comprising a dried paste of noble metal derived from said noble metal salt, said fluorocarbon polymer and said activated carbon on said fugitive substrate; the third step of placing a metal current collecting grid between a pair of said first units in contact with the dried paste of each said first units, thereby to provide a first sub-assembly comprising a sandwich of said metal current collecting grid between a pair of said first units; the fourth step of pressing the first sub-assembly at a temperature not exceeding about 150° C; the fifth step of removing said fugitive substrate, thereby to provide a second sub-assembly; the sixth step of applying a semi-permeable membrane to one face of said second sub-assembly, thereby to provide a third sub-assembly; and the final step of pressing said third sub-assembly together at a temperature not exceeding about 100° C, thereby to provide said electrode structure.

2. The method of claim 1 in which said fugitive substrate is aluminum foil, and in which said fugitive substrate is removed by dissolving with KOH solution.

3. The method of claim 1 wherein said metal, current collecting grid is formed of platinum, gold, stainless steel, nickel-clad iron, nickel wire mesh, silver wire mesh, expanded nickel, or expanded silver; wherein said noble metal is silver, platinum or palladium; wherein said fluorocarbon polymer is polytetrafluoroethylene; wherein said semi-permeable membrane is a fibrous polytetrafluoroethylene membrane or a microporous polypropylene membrane; wherein said second step is carried out at a temperature of about 150° C at 6400 p.s.i. for a time of about one-half hour; wherein said final step is carried out at a temperature of about 100° C at a pressure of about 1600 p.s.i.; and wherein said fugitive substrate is aluminum foil, and in which said fugitive substrate is removed by dissolving with KOH solution.

4. The method of claim 1 wherein said metal, current collecting grid is formed of platinum, gold, stainless steel, nickel-clad iron, nickel wire mesh, silver wire mesh, expanded nickel, or expanded silver; wherein said noble metal is silver, platinum or palladium; wherein said fluorocarbon polymer is polytetrafluoroethylene; wherein said semi-permeable membrane is a fibrous polytetrafluoroethylene membrane or a microporous polypropylene membrane; wherein said second step is carried out at a temperature of about 150° C at 6400 p.s.i. for a time of about one-half hour; wherein said final step is carried out at a temperature of about 100° C at a pressure of about 1600 p.s.i.; and wherein said fugitive substrate is aluminum foil, and in which saif fugitive substrate is removed by dissolving with KOH solution; and further wherein the proportions of water soluble noble metal salt, fluorocarbon polymer and activated carbon are so selected that said dried paste on said first unit has the composition:
about 5.0 mg/cm$^2$ silver,
about 20 mg/cm$^2$ activated carbon, and
about 2.5 mg/cm$^2$ polytetrafluoroethylene.

5. A gas permeable hydrophobic electrode structure produced in accordance with the method of claim 1, in which said wetting agent is octyl phenoxypolyoxyethanol; in which said metal, current collecting grid is formed of platinum, gold, stainless steel, nickel-clad iron, nickel wire mesh, silver wires mesh, expanded nickel, or expanded silver; in which said noble metal is silver, platinum or palladium; in which said fluorocarbon polymer is polytetrafluoroethylene; in which said semi-permeable membrane is a fibrous polytetrafluoroethylene membrane or a microporous polypropylene membrane; in which said fugitive substrate is aluminum foil, and in which said fugitive substrate is removed by dissolving with KOH solution; and in which the proportions of water soluble noble metal salt, fluorocarbon polymer and activated carbon are so selected that said dried paste on said first unit has the composition:

about 2.4 to about 7.5 mg/cm$^2$ noble metal,
about 20 mg/cm$^2$ activated carbon, and
about 2.0 to about 4.0 mg/cm$^2$ fluorocarbon polymer.

6. An improved, method for preparing a major sub-assembly for use in providing a gas permeable hydrophobic electrode structure comprising: the first step of applying a paste comprising water, a wetting agent and solids consisting essentially of water-soluble noble metal salt, a fluorocarbon polymer, and activated carbon to a fugitive substrate; the second step of heating and drying such paste at a temperature not exceeding about 150° C for a time sufficient to provide a first unit comprising a dried paste of noble metal, fluorocarbon polymer and activated carbon on said fugitive substrate; the third step of placing a metal, current collecting grid between a pair of said first units in contact with the dried paste of each said first unit, thereby to provide a first sub-assembly comprising a sandwich of said metal current collecting grid between a pair of said first unite; and the fourth step of pressing the first sub-assembly at a temperature not exceeding about 150° C, thereby to provide said major sub-assembly.

7. A major sub-assembly for preparing a gas permeable hydrophobic electrode structure produced in accordance with the method of claim 6, in which said wetting agent is octyl phenopolyoxyethanol; in which said metal, current collecting grid is formed of platinum, gold, stainless steel, nickel-clad iron, nickel wire mesh, silver wire mesh, expanded nickel, or expanded silver; in which said noble metal is silver, platinum or palladium; in which said fluorocarbon polymer is polytetrafluoroethylene; in which said semi-permeable membrane is a fibrous polytetrafluoroethylene membrane or a microporous polypropylene membrane; in which said fugitive substrate is aluminum foil, and in which the proportions of water soluble noble metal salt, fluorocarbon polymer and activated carbon are so selected that said dried paste on said first unit has the composition:

about 2.5 to about 7.5 mg/cm$^2$ noble metal,
about 20 mg/cm$^2$ activated carbon, and
about 2.0 to about 4.0 mg/cm$^2$ fluorocarbon polymer.

* * * * *